US010941032B2

(12) United States Patent
Waguespack et al.

(10) Patent No.: US 10,941,032 B2
(45) Date of Patent: Mar. 9, 2021

(54) LOADING ARM SYSTEM

(71) Applicant: OIL STATES INDUSTRIES, INC., Arlington, TX (US)

(72) Inventors: Marc Waguespack, Napoleonville, LA (US); Lee Arceneaux, Houma, LA (US)

(73) Assignee: OIL STATES INDUSTRIES, INC., Arlington, TX (US)

( * ) Notice: Subject to any disclaimer, the term of this patent is extended or adjusted under 35 U.S.C. 154(b) by 0 days.

(21) Appl. No.: 16/117,533

(22) Filed: Aug. 30, 2018

(65) Prior Publication Data

US 2019/0062145 A1 Feb. 28, 2019

Related U.S. Application Data

(60) Provisional application No. 62/552,297, filed on Aug. 30, 2017.

(51) Int. Cl.
*B67D 9/02* (2010.01)
*B63B 27/25* (2006.01)
(Continued)

(52) U.S. Cl.
CPC ............... *B67D 9/02* (2013.01); *B63B 27/24* (2013.01); *B63B 27/25* (2013.01); *B63B 27/34* (2013.01);
(Continued)

(58) Field of Classification Search
CPC ....... B67D 9/02; F16L 27/0861; B63B 27/25; B63B 27/34
(Continued)

(56) References Cited

U.S. PATENT DOCUMENTS 1,478,925 A 12/1923 Steed
3,085,593 A 4/1963 Sorensen
(Continued)

FOREIGN PATENT DOCUMENTS

EP 0679606 A1 11/1995
EP 2543624 A1 1/2013
(Continued)

OTHER PUBLICATIONS

Machine generated English translation for foreign patent document FR2163073 A5, listed as item #29 above, retrieved from Espacenet on Aug. 30, 2018, 14 pages.
(Continued)

*Primary Examiner* — Kevin L Lee
(74) *Attorney, Agent, or Firm* — Polsinelli PC

(57) ABSTRACT

A liquid loading device including a vertical lattice support structure, a platform coupled to the vertical lattice support structure, and a riser pipe located within the vertical lattice support structure and coupled to the vertical lattice support structure to substantially remain rotation free relative to the vertical lattice support structure. The device further includes a first rotatable joint located on a distal end of the riser pipe in which the first rotatable joint is operable to rotate relative to the riser pipe. The device further includes an arm extending from the platform and operable to be rotated relative to the platform. The device can also include a second rotatable joint coupled to the first rotatable joint through one or more rigid members, in which the second rotatable joint is operable to rotate relative to the platform. The device can further include an extension pipe extending from the second rotatable joint to a distal end of the arm.

19 Claims, 8 Drawing Sheets

(51) Int. Cl.
*B66C 23/18* (2006.01)
*B63B 27/34* (2006.01)
*F16L 27/08* (2006.01)
*B63B 27/24* (2006.01)
*B67D 9/00* (2010.01)

(52) U.S. Cl.
CPC ............... *B66C 23/18* (2013.01); *B67D 9/00* (2013.01); *F16L 27/0861* (2013.01)

(58) Field of Classification Search
USPC ......................................................... 137/615
See application file for complete search history.

(56) References Cited

U.S. PATENT DOCUMENTS

| | | | |
|---|---|---|---|
| 3,228,421 A | 1/1966 | Sheiry | |
| 3,236,259 A | 2/1966 | Ashton | |
| 3,409,046 A | 11/1968 | Means | |
| 3,434,491 A | 3/1969 | Bily | |
| 3,434,497 A | 3/1969 | Bily | |
| 3,554,231 A | 1/1971 | Caregnato | |
| 3,581,769 A | 6/1971 | Haley et al. | |
| 3,585,801 A * | 6/1971 | Koehler | E02B 17/0004 405/227 |
| 3,590,870 A | 7/1971 | Ashton | |
| 3,651,832 A | 3/1972 | Meyer | |
| 3,675,680 A | 7/1972 | Frohlich et al. | |
| 3,805,834 A | 4/1974 | Bily | |
| 3,891,004 A | 6/1975 | Knight | |
| 4,050,585 A | 9/1977 | Wilms | |
| 4,090,538 A * | 5/1978 | Kotcharian | B63B 21/50 137/236.1 |
| 4,109,681 A | 8/1978 | Stahl | |
| 4,111,465 A | 9/1978 | Knight | |
| 4,142,551 A | 3/1979 | Wilms | |
| 4,143,675 A | 3/1979 | Knight | |
| 5,983,936 A | 11/1999 | Schwieterman et al. | |
| 6,675,822 B1 | 1/2004 | Schmitz et al. | |
| 7,954,512 B2 | 6/2011 | Le Devehat | |
| 8,181,662 B2 | 5/2012 | Pollack et al. | |
| 9,470,349 B2 | 10/2016 | Am et al. | |
| 9,644,764 B2 | 5/2017 | Kelly et al. | |
| 9,708,040 B2 | 7/2017 | Le Devehat et al. | |
| 2011/0066290 A1 * | 3/2011 | Le Devehat et al. | B63B 27/24 700/279 |
| 2013/0240683 A1 | 9/2013 | Fusy | |
| 2015/0225970 A1 | 8/2015 | Westermann et al. | |
| 2016/0153245 A1 * | 6/2016 | Roodenburg et al. | E21B 19/002 166/352 |
| 2018/0298694 A1 * | 10/2018 | Van Duivendijk et al. | E21B 3/02 |

FOREIGN PATENT DOCUMENTS

| | | |
|---|---|---|
| EP | 2543624 B1 | 6/2016 |
| EP | 2671839 B1 | 1/2018 |
| EP | 3078625 B1 | 2/2018 |
| FR | 2163073 A5 | 7/1973 |
| GB | 1337726 A | 11/1973 |
| GB | 2163722 A | 3/1986 |
| WO | WO 2017/217917 A1 | 12/2017 |

OTHER PUBLICATIONS

International Search Report and Written Opinion, dated Nov. 16, 2018, for the corresponding International Application No. PCT/US18/48924 in 13 pages.

* cited by examiner

LOADING ARM SYSTEM

CROSS REFERENCE TO RELATED APPLICATIONS

This application claims the benefit of U.S. Provisional Application No. 62/552,297, filed Aug. 30, 2017, the disclosures of which is hereby incorporated by reference in its entirety.

FIELD

The present application is directed to loading arms and loading arm systems for the loading of fluids through a pipe from a vessel to a dock or platform or from a dock or platform to a vessel. More specifically, the present disclosure pertains to loading arms and loading systems for the loading of liquids.

BACKGROUND

Typical loading arms used in the petroleum industry are balanced pipe structures that are used to transport liquids, often cryogenic liquids, from dock-to-vessel, vessel-to-vessel, or vessel-to-dock, in situations in which the dock may be an ocean platform or a shore facility. Such loading arms involve a counterbalanced system sitting on top of a riser pipe. A typical design may be a four-bar linkage, in which one of the "links" is a pipe that carries the fluid downward toward the barge. Opposite of the extended "link" is a counterweight link containing whatever weight necessary to balance the system on top of the riser pipe. The structures are able to slew or rotate on top of the riser pipe via a slew bearing and can also pivot vertically in the same spot on top of the riser via ball bearings. The structures are actuated via small cylinders that move the shape of the four bar linkage, causing the extended process pipe to move towards or away from the vessel in unison with the counter weight.

BRIEF DESCRIPTION OF THE DRAWINGS

Embodiments of the present application are described, by way of example only, with reference to the attached Figures, wherein.

Figure 1:
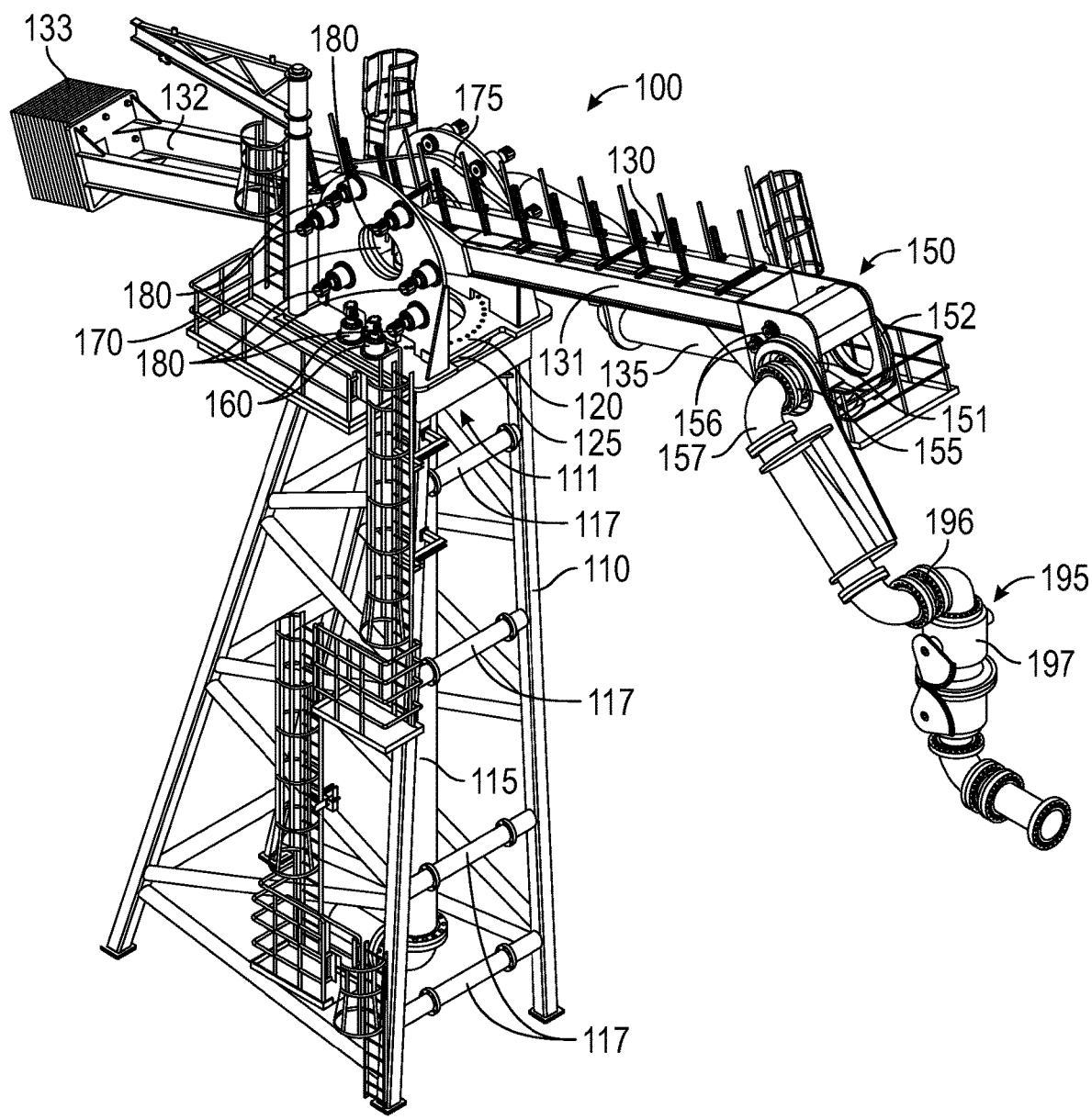
FIG. 1 is a perspective view of a liquid loading device, according to an example of the present disclosure.

It should be understood that the various aspects are not limited to the arrangements and instrumentality shown in the drawings.

DETAILED DESCRIPTION

It will be appreciated that numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The terms "comprising," "including" and "having" are used interchangeably in this disclosure. The terms "comprising," "including" and "having" mean to include, but are not necessarily limited to, the things so described. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "approximately" is defined as near or approaching a certain state, condition, goal, or standard.

The present disclosure provides liquid loading devices and loading arm systems for the loading of liquids including oil, gas, liquefied natural gas (LNG), and compressed gas liquid (CGL). The presently disclosed liquid loading devices and loading arm systems do not require completely balancing the loading arm via counterweights. Rather, the presently disclosed devices and systems use a combination of counterweights, motors, and hydraulics to make the loading arm system neutral or static. In particular, the presently disclosed liquid loading device may include a vertical lattice support structure around the riser pipe to withstand forces, including the overturning moment load and compression loading, thereby completely freeing the riser pipe of load bearing responsibility. Thus, the riser pipe can be said to be substantially free of load bearing responsibility.

The arm of the liquid loading device is constructed on a vertical lattice support structure with a crane-type platform gear or balking gear on top. A riser pipe is supported up through the vertical lattice support structure and through the platform gear or balking gear where two swivel assemblies allow the entire structure to slew (rotate side to side) and boom up and down. The loading arm includes a counterweight that is rigid to the main boom and a single, second "jib" boom. The structure includes two pivot points in the structure, which greatly simplifies the mechanism and reduces the weight of the system by only having two "boom" pieces.

A pinion or gear set is used at each articulation point. This allows the boom rotation to be controlled by several hydraulic motors/gearboxes, allowing for redundancy, integral brakes, and constant angular velocity in both directions. These hydraulic motors/gearboxes also provide the necessary constant torque to balance the system. Since the system is only partially counterweighted, the remaining torque is counteracted via hydraulics in order to make the system balanced. While the system is generally described based on hydraulic motors, the system in at least one example can include one or more electric motors.

The vertical lattice support structure also comprises bolt in members. This allows for easy installation over the riser pipe, and full serviceability of the riser pipe (removal, maintenance, etc.) without removing the entire loading arm section mounted above, since it is supported by the vertical lattice support structure rather than the riser.

FIG. 1 is a perspective view of a liquid loading device 100, according to an example of the present disclosure. As depicted in FIG. 1, liquid loading device 100 includes a vertical lattice support structure 110 surrounding a riser pipe 115. Riser pipe 115 is located within the vertical lattice support structure 110 and coupled to the vertical lattice support structure 110 to substantially remain rotation free relative to the vertical lattice support structure 110. The vertical lattice support structure can include a plurality of removable members 117. The removable members 117 are operable to facilitate the maintenance and removal of the riser pipe. While the removable members 117 are illustrated on the front of the vertical lattice support structure, the removable members 117 can be located on the sides and/or back, either instead of being on the front or in addition to being on the front. Liquid loading device 100 further includes a platform 120 coupled to the distal end 111 of the vertical lattice support structure 110. The platform 120 can be operable to rotate relative to the vertical lattice support structure 110. The platform 120 may comprise a platform gear 125 coupled to the vertical lattice support structure 110 and a plurality of platform motors 160 operable to rotate the platform 120 relative to the gear 125 and the vertical lattice support structure 110. In other examples, the location of the platform motors 160 and gear can be reversed, such that the platform motors are located on the platform and rotate a gear, that can be a platform gear or a balking gear. The plurality of platform motors 160 is operable to rotate the arm and extension pipe left and right along the length of a vessel's hull.

As depicted in FIG. 1, device 100 further includes an arm 130 extending from the platform 120. The arm 130 can be coupled to the platform 120 at pivot point 170. An extension portion 131 of arm 130 extends in the direction of the extension pipe 135 and a counter balance portion 132 that extends in a direction opposite to the extension pipe 135. The counter balance portion 132 can be coupled to one or more weights 133. While portion 132 is described as a counter balance portion, the portion 132 does not completely counter balance the other portion opposite the pivot point 170.

The arm 130 can be operable to be rotated relative to the platform 120. Arm 130 is coupled to an extension pipe 135 extending to a distal end of extension portion 131 of arm 130. Extension pipe 135 is coupled to riser pipe 115 via a first rotatable joint 140, a second rotatable joint 145, and an intervening rigid pipe segment 147 (not shown) (refer to FIG. 9). In at least some instances, the plurality of platform motors 160 are electrically coupled to a controller (not shown) that is operable to adjust the plurality of platform motors 160 so as to prevent residual forces from forming in the first rotatable joint 140.

The liquid loading device 100 can further include a pair of articulation gears 175 coupled to the arm 130. A plurality of articulation motors 180 can be coupled to the platform 120 and be operable to rotate the pair of articulation gears 175 relative to the platform 120. The plurality of articulation motors 180 are capable of rotating arm 130, and extension pipe 135 coupled to arm 130, relative to the platform 120. The plurality of articulation motors 180 can be electrically coupled to a controller (not shown) so as to prevent residual forces from forming in the second rotatable joint 145. The plurality of articulation motors 180 is operable to rotate the arm and extension pipe up and down along the vertical height of a vessel's hull.

Device 100 can further include an end rotating device 150 coupled to the distal end of arm 130 and operable to rotate rigid pipe segment 157 relative to the arm 130. Device 100 can further include a third rotatable joint 155 coupled to a distal end of the extension pipe 135. The third rotatable joint 155 couples the extension pipe 135 to rigid pipe segment 157 and is operable to rotate rigid pipe segment 157 relative to the arm 130. End rotating device 150 can include one or more end rotating device gears 151, 152 coupled to the third rotatable joint 155 and operable to rotate the rigid pipe segment 157 relative to the arm 130 about third rotatable joint 155. As depicted in FIG. 1, end rotating device 150 can include a plurality of end rotating device motors 155 coupled to the distal end of arm 130 and operable to rotate the one or more end rotating device gears 151, 152 to rotate rigid pipe segment 157 relative to arm 130. The end rotating device 150 can further include a plurality of end rotating device motors 156 coupled to the distal end of arm 130 and the one or more end rotating device gears 151, 152. The plurality of end rotating device motors 156 can be operable to rotate the one or more end rotating device gears 151, 152 to rotate rigid pipe segment 157 relative to arm 130. The plurality of end rotating device motors 156 can be electrically coupled to a controller (not shown) that is operable to adjust the plurality of end rotating device motors 156 so as to prevent residual forces forming in the third rotatable joint 155.

Device 100 can further include a vessel attachment assembly 195 comprising a fourth rotatable joint 196 coupling the rigid pipe segment 157 to rigid pipe segment 197. The vessel attachment assembly 195 coupled to the extension pipe 135 and operable to rotate rigid pipe segment 197 relative to rigid pipe segment 157 in order to facilitate attachment to a vessel for loading and off-loading liquids.

Figure 2:
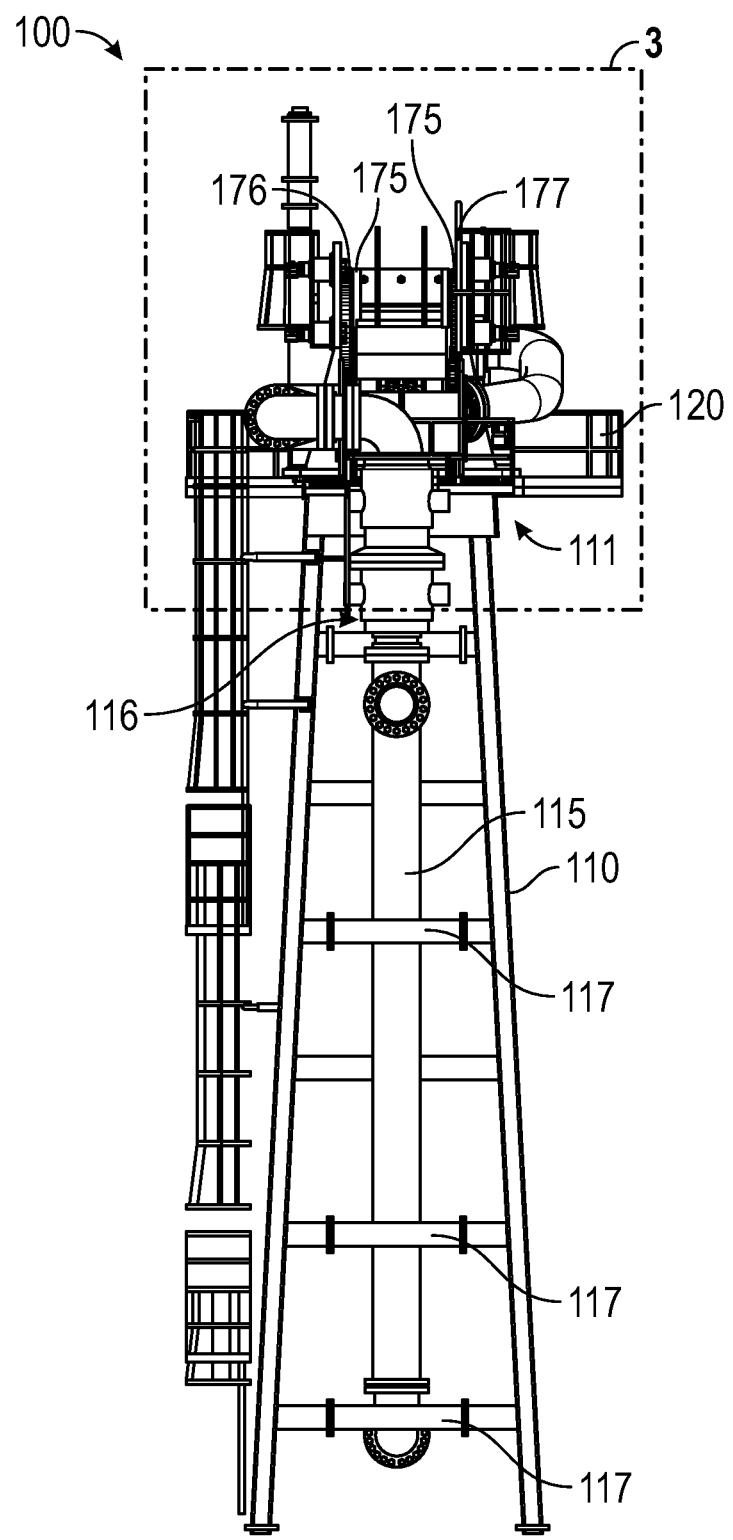
FIG. 2 is a front elevation view of the liquid loading device, according to an example of the present disclosure.

FIG. 2 is a front elevation view of the liquid loading device 100, according to an example of the present disclosure. As depicted in FIG. 2, riser pipe 115 is located within the vertical lattice support structure 110, which can include the removable members 117. Liquid loading device 100 further includes a platform 120 coupled to the distal end 111 of the vertical lattice support structure 110. The liquid loading device 100 further includes a pair of articulation gears 175 coupled to the arm 130. The pair of articulation gears 175, including right articulation gear 176 and left articulation gear 177, are operable to rotate relative to platform 120.

Figure 3:
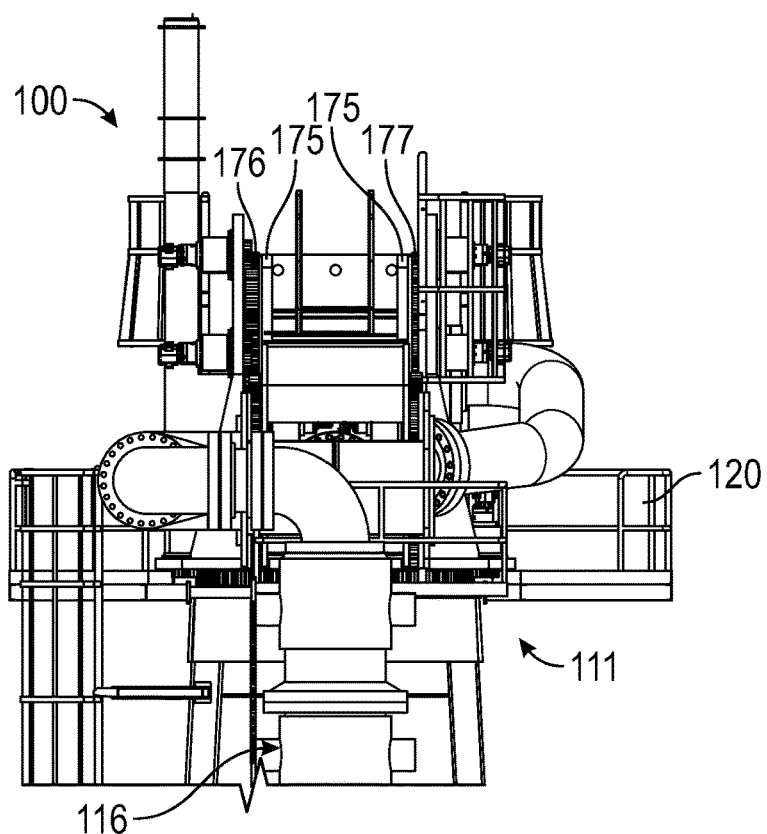
FIG. 3 is a close-up view of the platform portion of FIG. 2, according to an example of the present disclosure.

FIG. 3 is a close-up view of the platform portion of FIG. 2, according to an example of the present disclosure. As depicted in FIG. 3, a pair of articulation gears 175 are coupled to the arm 130. In particular, right articulation gear 176 and left articulation gear 177 are operable to rotate relative to platform 120.

Figure 4:
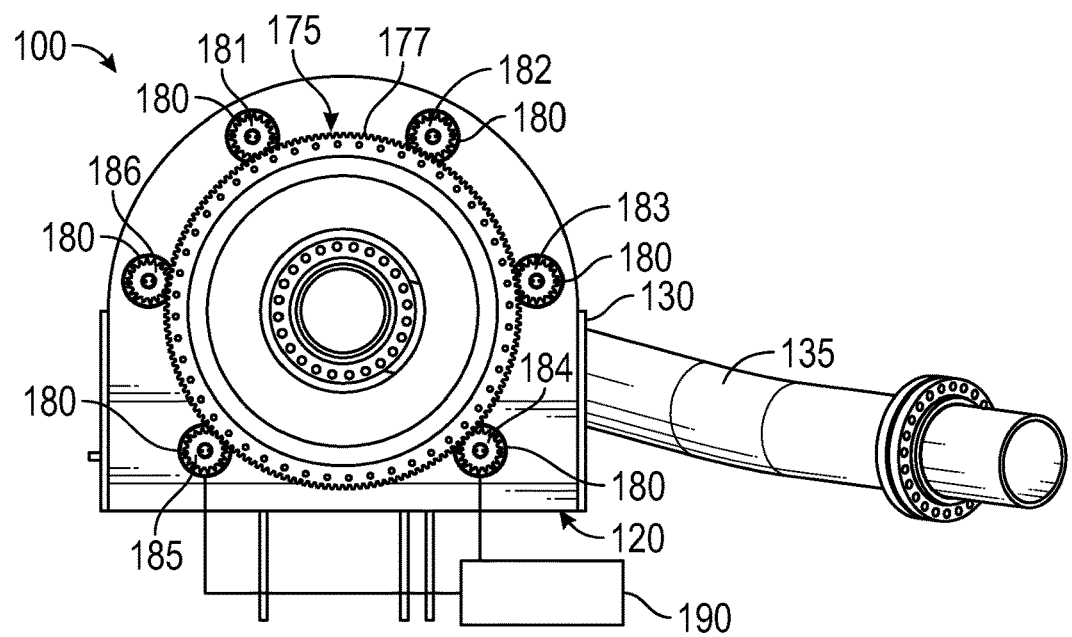
FIG. 4 is a close-up sectional view of one of a pair of articulation gears and a plurality of articulation motors, according to an example of the present disclosure.

FIG. 4 is a close-up sectional view of one of the pair of articulation gears 175 and the plurality of articulation motors 180, according to an example of the present disclosure. Specifically, FIG. 4 depicts a sectional view of left articulation gear 177 operable to rotate relative to platform 120. A plurality of articulation motors 180 are coupled to the platform 120 and are operable to rotate the pair of articulation gears 175, including left articulation gear 177, relative to the platform 120 so as to rotate arm 130, and extension pipe 135 coupled to arm 130, relative to the platform 120. As depicted in FIG. 4, the plurality of articulation motors 180 can include articulation motors 181, 182, 183, 184, 185, 186. The plurality of articulation motors 180 can be electrically coupled to a controller 190. Controller 190 can be operable to operate the plurality of articulation motors 180 so as to prevent residual forces from forming in the second rotatable joint 145. Controller 190 can also be operable to operate the plurality of articulation motors 180 so as to rotate arm 130 and extension pipe 135 to facilitate coupling to a vessel or dock in order to facilitate liquid loading or off-loading. While shown positioned adjacent to one or more of the pair of articulation gears 175, controller 190 can be positioned at location within the liquid loading device 100. Controller 190 can also be remotely located away from, but electrically coupled with, liquid loading device 100. In at least one instance, the liquid loading device 100 includes a plurality of controllers 190, each controller 190 operable to operate one rotatable joint or pivot point. In other instance, a single controller 190 can be operable to operate a plurality of rotatable joints or pivot points.

Figure 5:
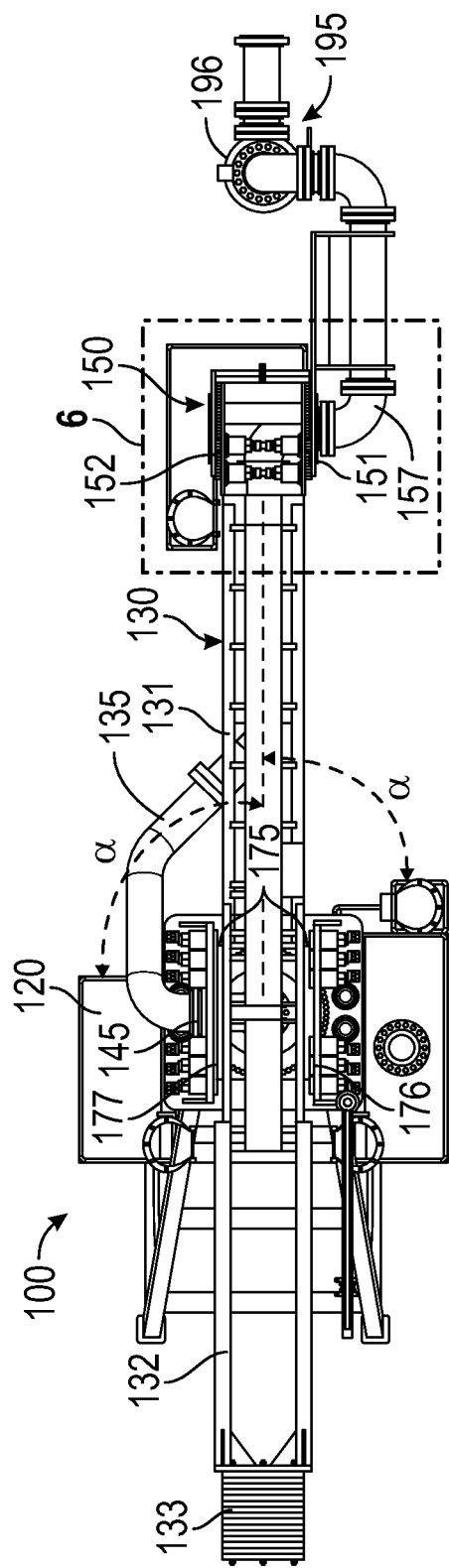
FIG. 5 is a top plan view of liquid loading device, according to an example of the present disclosure.

FIG. 5 is a top plan view of liquid loading device 100. As depicted in FIG. 5, arm 130 extends from the platform 120. Extension portion 131 of arm 130 is coupled to extension pipe 135. Extension portion 131 of arm 130 extends in the direction of the extension pipe 135 and a counter balance portion 132 that extends in a direction opposite to the extension pipe 135. The counter balance portion 132 can be coupled to one or more weights 133. Extension pipe 135 is coupled to riser pipe 115 via a second rotatable joint 145, and an intervening rigid pipe segment 147 (not shown) and first rotatable joint 140 (not shown) (refer to FIG. 9). As shown in FIG. 5, liquid loading device 100 includes a pair of articulation gears 175 coupled to the arm 130. The pair of articulation gears 175, including left articulation gear 177 and right articulation gear 176, are operable to rotate arm 130, and extension pipe 135 coupled to arm 130, relative to the platform 120. Device 100 also includes end rotating device 150 coupled to the distal end of arm 130 and operable to rotate rigid pipe segment 157 relative to the arm 130.

Figure 6:
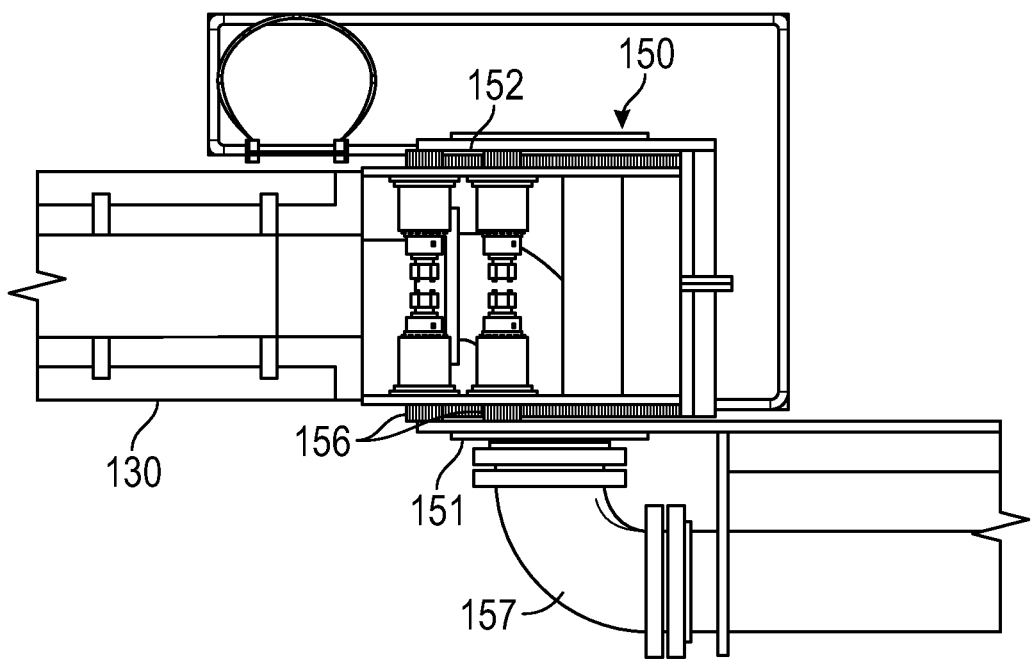
FIG. 6 is a close-up view of the end rotating device of FIG. 5, according to an example of the present disclosure.

FIG. 6 is a close-up view of the end rotating device 150 of FIG. 5. As shown in FIG. 6, end rotating device 150 includes one or more end rotating device gears 151, 152. The plurality of end rotating device motors 156 can be operable to rotate the one or more end rotating device gears 151, 152 to rotate rigid pipe segment 157 relative to arm 130.

Figure 7:
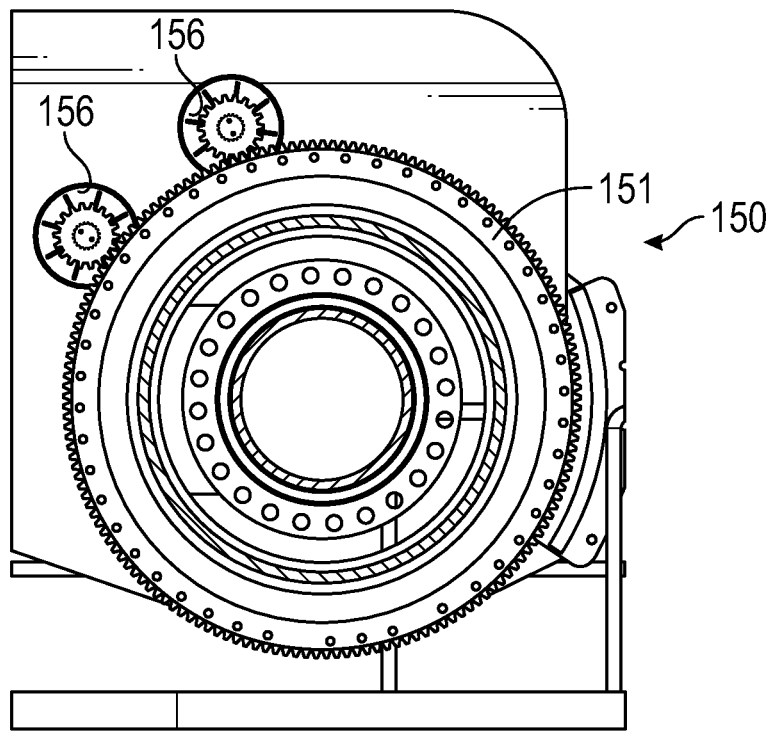
FIG. 7 is a close-up sectional view of the end rotating device of FIG. 5.

FIG. 7 is a close-up sectional view of the end rotating device 150 of FIG. and FIG. 6. As shown in FIG. 7, the end rotating gear 151 is operationally coupled with the plurality end rotating device motors 156. The end rotating device motors 156 can be operable to rotate the end rotating device gear 151, thereby rotating rigid pipe segment 157 relative to arm 130. The end rotating gear 152 arrangement can be a mirror image of FIG. 7, and with a plurality of end rotating device motors 156 operable to rotate end rotating gear 151 in unison with end rotating gear 152.

Figure 8:
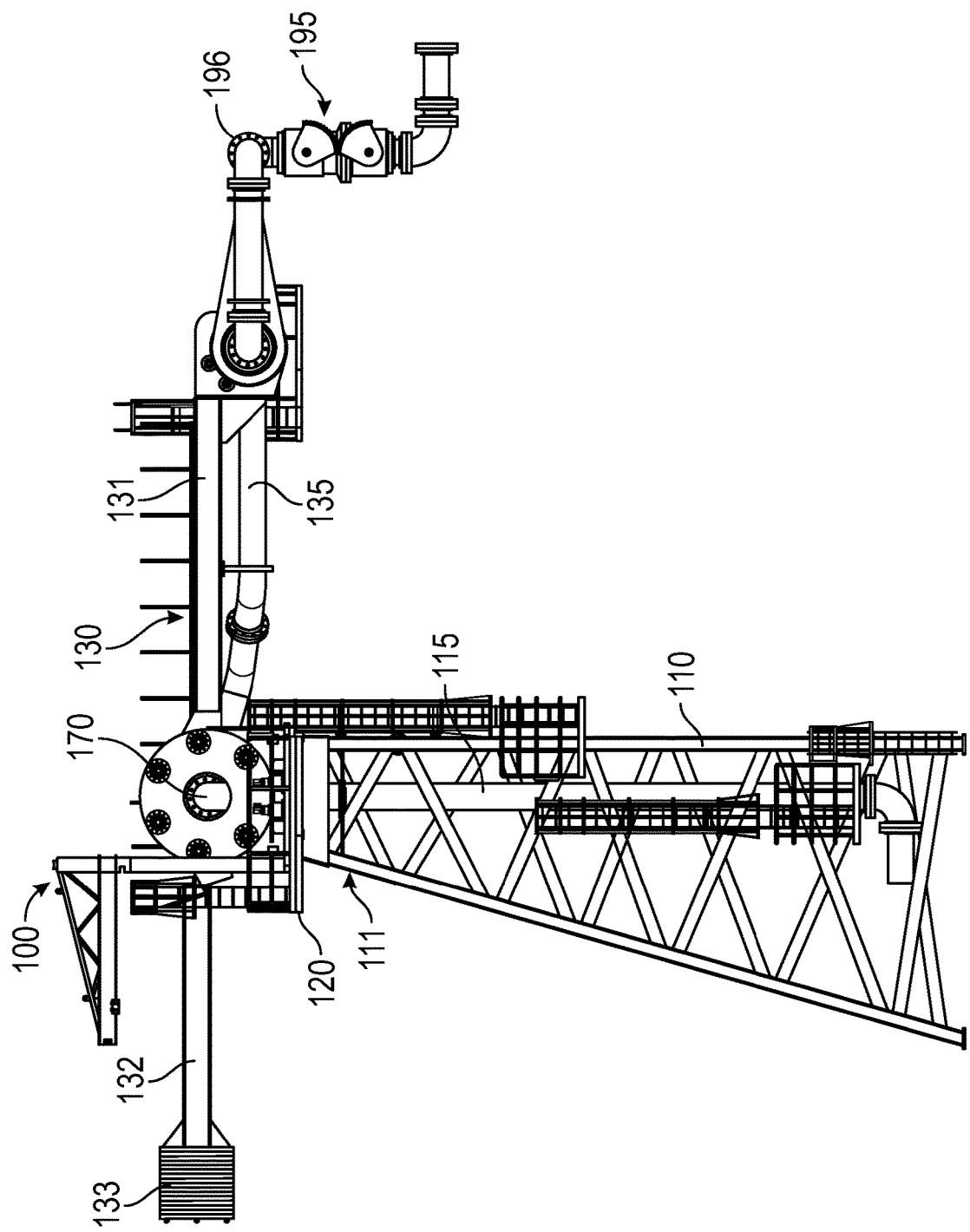
FIG. 8 is a right side elevation view of the liquid loading device, according to an example of the present disclosure.

FIG. 8 is a right side elevation view of the liquid loading device 100. Riser pipe 115 is located within the vertical lattice support structure 110 and coupled to the vertical lattice support structure 110. Platform 120 is coupled to the distal end 111 of the vertical lattice support structure 110. Arm 130 is coupled to the platform 120 at pivot point 170 and extends from the platform 120. Specifically, extension portion 131 of arm 130 extends in the direction of the extension pipe 135 and a counter balance portion 132 extends in a direction opposite to the extension pipe 135. The counter balance portion 132 can be coupled to one or more weights 133. Arm 130 is coupled to an extension pipe 135 extending to a distal end of the extension portion 131 of arm 130.

Figure 9:
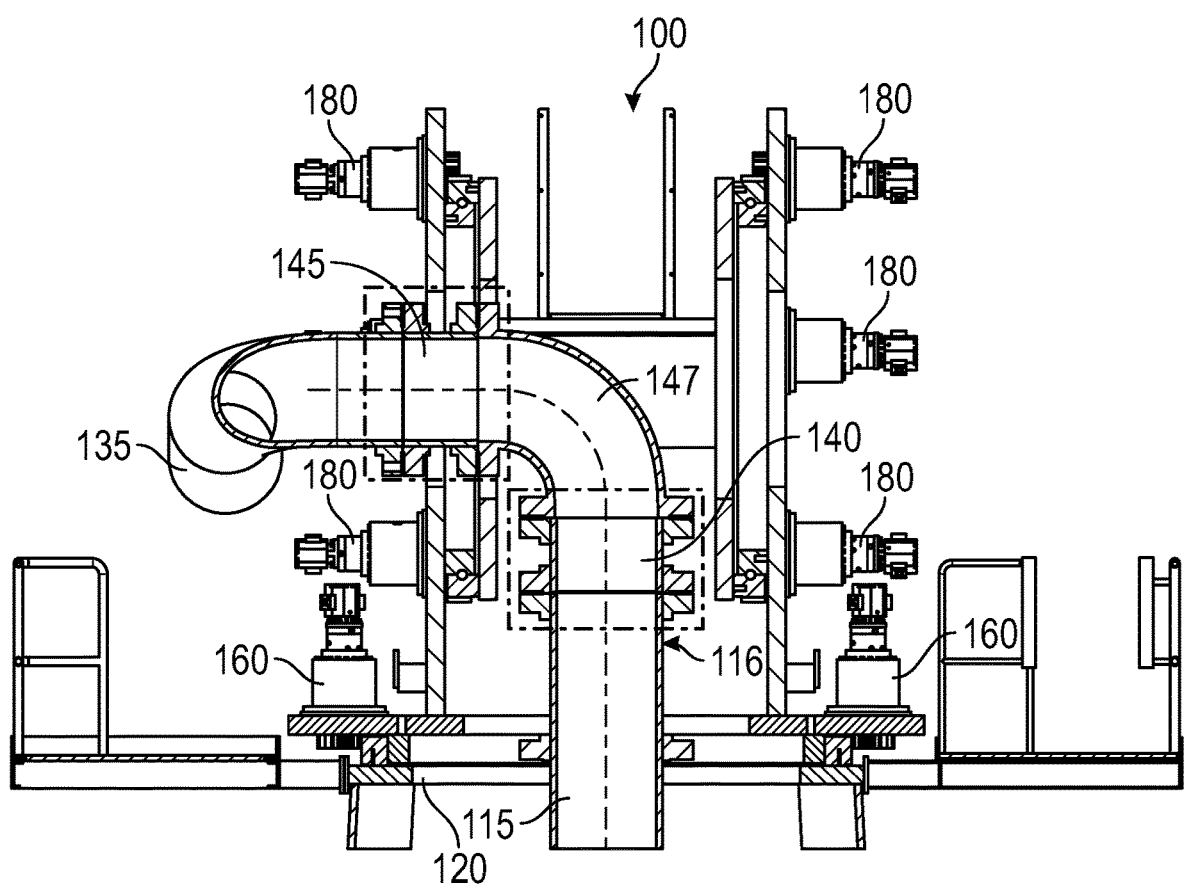
FIG. 9 is a close-up sectional back elevation view of platform portion of the liquid loading device, according to an example of the present disclosure.

FIG. 9 is a close-up sectional back elevation view of platform portion of the liquid loading device. As depicted in FIG. 9, riser pipe 115 extends through vertical lattice support structure and platform 120. The platform 120 can be operable to rotate relative to the vertical lattice support structure by operation of a plurality of platform motors 160 operable to rotate the platform 120 relative to the vertical lattice support structure via the platform gear. Extension pipe 135 is coupled to riser pipe 115 via a first rotatable joint 140, a second rotatable joint 145, and an intervening rigid pipe segment 147. The first rotatable joint 140 is located on the distal end 116 of the riser pipe 115. The first rotatable joint 140 is operable to rotate relative to the riser pipe 115. The second rotatable joint 145 is coupled to the first rotatable joint 140 through one or more rigid members, such as rigid pipe segment 147. The second rotatable joint 145 is operable to rotate relative to the platform 120. FIG. 9 also shows a plurality of articulation motors 180 coupled to the platform 120 and operable to rotate the rotating arm 130, and extension pipe 135 coupled to arm 130, relative to the platform 120 via the pair of articulation gears 175.

Figure 10:
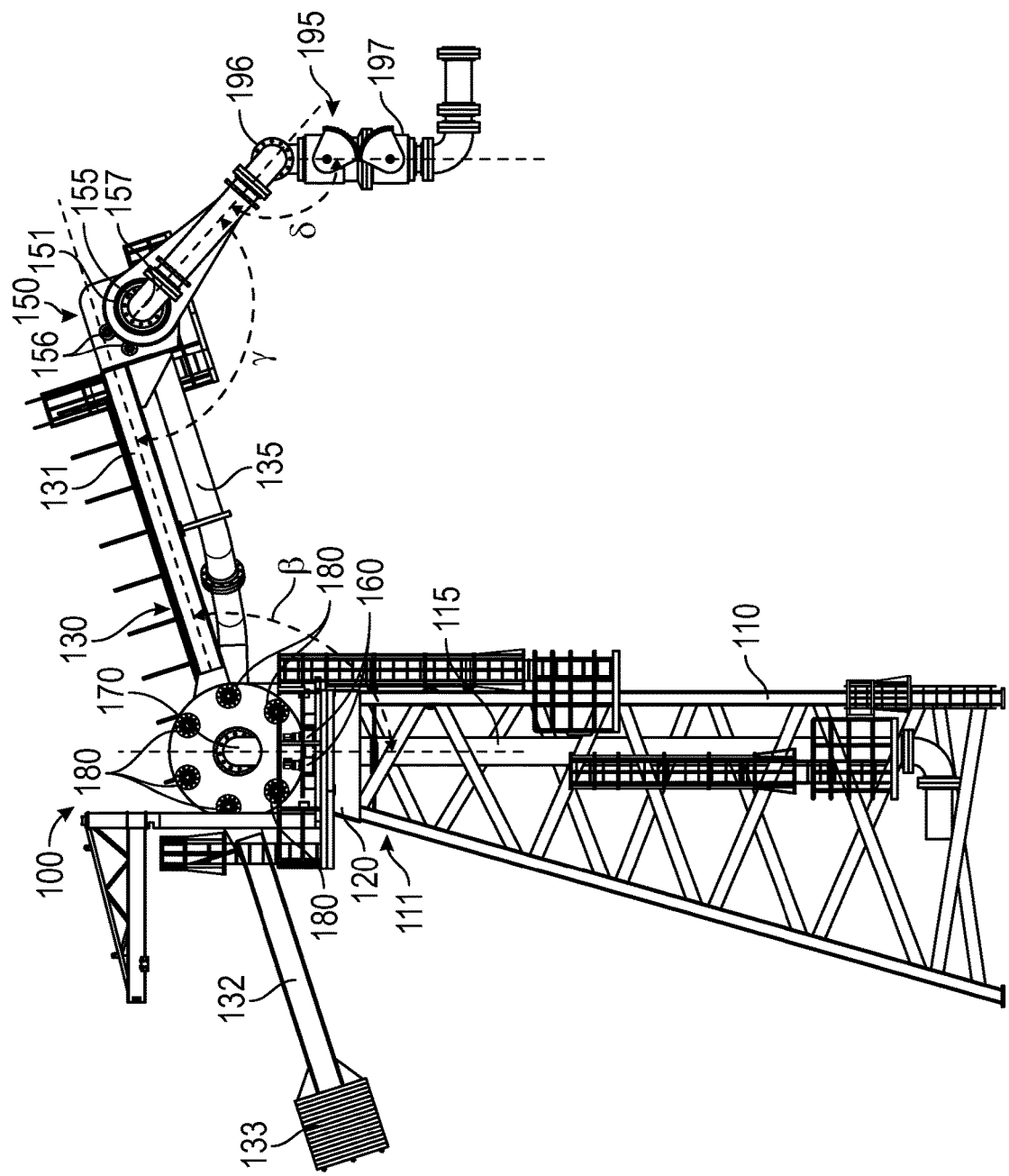
FIG. 10 is a right side elevation view of the liquid loading device, according to an example of the present disclosure.

FIG. 10 is a right side elevation view of the liquid loading device 100. Riser pipe 115 is located within the vertical lattice support structure 110 and coupled to the vertical lattice support structure 110. Platform 120 is coupled to the distal end 111 of the vertical lattice support structure 110. Arm 130 is coupled to the platform 120 at pivot point 170 and extends from the platform 120. Specifically, extension portion 131 of arm 130 extends in the direction of the extension pipe 135 and a counter balance portion 132 extends in a direction opposite to the extension pipe 135. The counter balance portion 132 can be coupled to one or more weights 133. Arm 130 is coupled to an extension pipe 135 extending to a distal end of the arm 130.

As depicted in FIG. 10, device 100 is operable to load or off-load liquids to a vessel by articulation or rotation about the previously described articulation or pivot points that further rely on at least four joints in the other rigid pipe structures. In particular, the plurality of platform motors 160 are operable to rotate platform 120 relative to vertical lattice support structure 110 such that arm 130 is capable of being rotated according to angle $\alpha$ formed by the intersection of arm 130 with a vertical plane defined by the vertical axis of the vertical lattice support structure 110, as depicted in FIG. 5. Arm 130 may be rotated about pivot point 170 according to angle $\beta$ formed by the intersection of arm 130 with a longitudinal axis extending from the center of riser pipe 115, as shown in FIG. 10. The longitudinal axis extending from the riser pipe 115 can be substantially vertical, such that rotation of arm 130 to a substantially horizontal position generates an angle $\beta$ of approximately 90° (degrees). Angle $\beta$ can be acute when a longitudinal axis extending through the center of arm 130 has a substantially negative slope and angle $\beta$ can be obtuse when the longitudinal axis of the arm 130 has a substantially positive slope.

Rigid pipe segment 157 may be rotated about third rotatable joint 155 relative to extension pipe 135 forming angle $\gamma$. Angle $\gamma$ can be defined by the intersection of rigid pipe segment 157 with a longitudinal axis extending through the center of extension pipe 135, as shown in FIG. 10. Angle $\gamma$ can be approximately 90 degrees, when extension pipe 135 and rigid pipe segment 157 are perpendicular to one another. Rotation of rigid pipe segment 157 past perpendicular, and away from extension pipe 135, causes angle γ to become obtuse. Angle γ can be approximately 180 degrees when rigid pipe segment 157 is substantially parallel to, and in-line with, extension pipe 135.

Finally, rigid pipe segment 197 may be rotated about fourth rotatable joint 196 relative to rigid pipe segment 157 forming angle δ. Angle δ can be defined by the intersection of rigid pipe segment 197 with a longitudinal axis extending through the center of rigid pipe segment 157, as shown in FIG. 10. Rotation of rigid pipe segment 197 to be substantially parallel to, and in-line with, rigid pipe segment 157 generates angle δ of approximately 180 degrees.

Each of pivot point 170, third rotatable joint 155, and fourth rotatable joint 196 can be rotated independently of one another, thus allowing individual adjustment of angles β, γ, and δ, respectively.

Additionally, the presently disclosed liquid loading device 100 is capable of operation in cases in which the counter balance portion 132 of arm 130, including weights 133 coupled to the counter balance portion 132, is not substantially equal in mass to the extension portion 131 of arm 130, including the extension pipe 135, end rotating device 150, and vessel attachment assembly 195. In at least some instances, the liquid loading device 100 is capable of operation in cases in which the mass of the counter balance portion 132 of arm 130 and weights 133 is substantially less than the mass of the extension portion 131 of arm 130, including the extension pipe 135, end rotating device 150, and vessel attachment assembly 195.

Numerous examples are provided herein to enhance understanding of the present disclosure. A specific set of statements are provided as follows.

Statement 1: A liquid loading device is disclosed comprising: a vertical lattice support structure; a platform coupled to a distal end of the vertical lattice support structure, the platform operable to rotate relative to the vertical lattice support structure; a riser pipe being located within the vertical lattice support structure and coupled to the vertical lattice support structure to substantially remain rotation free relative to the vertical lattice support structure; a first rotatable joint being located on a distal end of the riser pipe, wherein the first rotatable joint is operable to rotate relative to the riser pipe; an arm extending from the platform and operable to be rotated relative to the platform; a second rotatable joint coupled to the first rotatable joint through one or more rigid members, wherein the second rotatable joint is operable to rotate relative to the platform; an extension pipe extending from the second rotatable joint to a distal end of the arm.

Statement 2: A liquid loading device is disclosed according to Statement 1, further comprising a third rotatable joint coupled to a distal end of the extension pipe, wherein the third rotatable joint is operable to rotate relative the arm.

Statement 3: A liquid loading device is disclosed according to Statement 2, wherein the third rotatable joint couples the extension pipe to a rigid pipe segment, the third rotatable joint operable to rotate the rigid pipe segment relative to the arm.

Statement 4: A liquid loading device is disclosed according to any of preceding Statements 1-3, further comprising an end rotating device coupled to the distal end of the arm and operable to rotate relative to the arm.

Statement 5: A liquid loading device is disclosed according to Statement 4, wherein the end rotating device further comprises one or more end rotating device gears coupled to the third rotatable joint, the one or more end rotating gears operable to rotate the rigid pipe segment relative to the arm about the third rotatable joint.

Statement 6: A liquid loading device is disclosed according to Statement 5, wherein the end rotating device further comprises a plurality of end rotating device motors coupled to the distal end of the arm and to the one or more end rotating device gears, the plurality of end rotating device motors operable to rotate the one or more end rotating device gears to rotate the rigid pipe segment relative to the arm.

Statement 7: A liquid loading device is disclosed according to Statement 6, wherein the plurality of end rotating device motors are electrically coupled to a controller that is operable to adjust the plurality of end rotating device motors so as to prevent residual forces forming in the third rotatable joint.

Statement 8: A liquid loading device is disclosed according to any of preceding Statements 1-7, wherein the platform comprises: a platform gear coupled to the vertical lattice support structure and a plurality of platform motors that are operable to rotate the platform relative to the platform gear and vertical lattice support structure.

Statement 9: A liquid loading device is disclosed according to Statement 8, wherein the plurality of platform motors are electrically coupled to a controller that is operable to adjust the plurality of platform motors so as to prevent residual forces forming in the first rotatable joint.

Statement 10: A liquid loading device is disclosed according to Statements 8 or 9, wherein the platform gear is a balking gear.

Statement 11: A liquid loading device is disclosed according to any of preceding Statements 8-10, wherein the plurality of platform motors are operable to rotate the arm and extension pipe left and right along the length of a vessel's hull.

Statement 12: A liquid loading device is disclosed according to any of preceding Statements 1-11, wherein the arm is coupled to the platform at a pivot point and an extension portion of the arm extends in the direction of the extension pipe and a counter balance portion that extends in a direction opposite to the extension pipe and is coupled to one or more weights.

Statement 13: A liquid loading device is disclosed according to any of preceding Statements 1-13, further comprising a pair of articulation gears coupled to the arm and a plurality of articulation motors coupled to the platform, wherein the plurality of articulation motors are operable to rotate the pair of articulation gears relative to the platform.

Statement 14: A liquid loading device is disclosed according to Statement 13, wherein the plurality of articulation motors are electrically coupled to a controller that is operable to rotate the pair of articulation gears relative to the platform.

Statement 15: A liquid loading device is disclosed according to Statements 13 or 14, wherein the plurality of articulation motors are operable to rotate the arm and extension pipe up and down along the vertical height of a vessel's hull.

Statement 16: A liquid loading device is disclosed according to any of preceding Statements 1-15, wherein one or more of platform gear, pair of articulation gears, and end rotating device gears are characterized by constant angular velocity in both rotational directions.

Statement 17: A liquid loading device is disclosed according to any of preceding Statements 1-16, further comprising a vessel attachment assembly comprising a fourth rotatable joint, the vessel attachment assembly coupled to the extension pipe and operable to rotate relative to the rigid pipe segment.

Statement 18: A liquid loading device is disclosed according to any of preceding Statements 1-17, wherein the counter balance portion of the arm, including weights coupled to the counter balance portion, is not substantially equal in mass to the extension portion of the arm, including the extension pipe, end rotating device, and vessel attachment assembly.

Statement 19: A liquid loading device is disclosed according to any of preceding Statements 1-18, wherein the mass of the counter balance portion of the arm and weights is substantially less than the mass of the extension portion of the arm, including the extension pipe, end rotating device, and vessel attachment assembly.

Statement 20: A liquid loading device is disclosed according to any of preceding Statements 1-19, wherein the riser pipe is substantially free of load bearing responsibility.

Statement 21: A liquid loading device is disclosed according to any of preceding Statements 1-20, wherein the vertical lattice support structure comprises bolt in members.

The description above includes example systems, methods, techniques, instruction sequences, and/or computer program products that embody techniques of the present disclosure. However, it is understood that the described disclosure can be practiced without these specific details.

It is believed that the present disclosure and many of its attendant advantages will be understood by the foregoing description, and it will be apparent that various changes can be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various examples, it will be understood that these examples are illustrative and that the scope of the disclosure is not limited to them. Many variations, modifications, additions, and improvements are possible. More generally, examples in accordance with the present disclosure have been described in the context of particular implementations. Functionality can be separated or combined in blocks differently in various examples of the disclosure or described with different terminology. These and other variations, modifications, additions, and improvements can fall within the scope of the disclosure as defined in the claims that follow.

We claim:

1. A liquid loading device comprising:
a vertical lattice support structure;
a platform coupled to a distal end of the vertical lattice support structure, the platform operable to rotate relative to the vertical lattice support structure;
a riser pipe being located within the vertical lattice support structure and coupled to the vertical lattice support structure to substantially remain rotation free relative to the vertical lattice support structure;
a first rotatable joint being located on a distal end of the riser pipe, wherein the first rotatable joint is operable to rotate relative to the riser pipe;
an arm extending from the platform and operable to be rotated relative to the platform;
a second rotatable joint coupled to the first rotatable joint through one or more rigid members, wherein the second rotatable joint is operable to rotate relative to the platform;
an extension pipe extending from the second rotatable joint to a distal end of the arm;
a third rotatable joint coupled to the extension pipe;
an end rotating device coupled to the distal end of the arm and operable to rotate relative to the arm, wherein the end rotating device further comprises one or more end rotating device gears coupled to the third rotatable joint, the one or more end rotating device gears operable to rotate the rigid pipe segment relative to the arm about the third rotatable joint.

2. The liquid loading device as recited in claim 1, wherein the third rotatable joint is coupled to a distal end of the extension pipe, wherein the third rotatable joint is operable to rotate relative to the arm.

3. The liquid loading device as recited in claim 2, wherein the third rotatable joint couples the extension pipe to a rigid pipe segment, the third rotatable joint operable to rotate the rigid pipe segment relative to the arm.

4. The liquid loading device as recited in claim 1, wherein the end rotating device further comprises a plurality of end rotating device motors coupled to the distal end of the arm and to the one or more end rotating device gears, the plurality of end rotating device motors operable to rotate the one or more end rotating device gears to rotate the rigid pipe segment relative to the arm.

5. The liquid loading device as recited in claim 4, wherein the plurality of end rotating device motors are electrically coupled to a controller that is operable to adjust the plurality of end rotating device motors so as to prevent residual forces forming in the third rotatable joint.

6. The liquid loading device as recited in claim 1, wherein the platform comprises: a platform gear coupled to the vertical lattice support structure and a plurality of platform motors that are operable to rotate the platform relative to the platform gear and vertical lattice support structure.

7. The liquid loading device as recited in claim 6, wherein the plurality of platform motors are electrically coupled to a controller that is operable to adjust the plurality of platform motors so as to prevent residual forces forming in the first rotatable joint.

8. The liquid loading device as recited in claim 6, wherein the platform gear is a balking gear.

9. The liquid loading device as recited in claim 6, wherein the plurality of platform motors are operable to rotate the arm and extension pipe left and right along the length of a vessel's hull.

10. The liquid loading device as recited in claim 1, wherein the arm is coupled to the platform at a pivot point, and an extension portion of the arm extends in the direction of the extension pipe and a counter balance portion that extends in a direction opposite to the extension pipe and is coupled to one or more weights.

11. The liquid loading device as recited in claim 1, further comprising a vessel attachment assembly comprising a fourth rotatable joint, the vessel attachment assembly coupled to the extension pipe by the fourth rotatable joint and operable to rotate relative to the rigid pipe segment.

12. The liquid loading device as recited in claim 1, wherein the riser pipe is substantially free of load bearing responsibility.

13. The liquid loading device as recited in claim 1, wherein the vertical lattice support structure comprises bolt in members.

14. The liquid loading device as recited in claim 1, further comprising:
a pair of articulation gears coupled to the arm and a plurality of articulation motors coupled to the platform, wherein the plurality of articulation motors are operable to rotate the pair of articulation gears relative to the platform.

15. The liquid loading device as recited in claim 14, wherein the plurality of articulation motors are electrically coupled to a controller that is operable to adjust the plurality of articulation motors so as to prevent residual forces forming in the second rotatable joint.

16. The liquid loading device as recited in claim 14, wherein the plurality of articulation motors are operable to rotate the arm and extension pipe up and down along the vertical height of a vessel's hull.

17. A liquid loading device comprising:

a vertical lattice support structure;

a platform coupled to a distal end of the vertical lattice support structure, the platform operable to rotate relative to the vertical lattice support structure;

a riser pipe being located within the vertical lattice support structure and coupled to the vertical lattice support structure to substantially remain rotation free relative to the vertical lattice support structure;

a first rotatable joint being located on a distal end of the riser pipe, wherein the first rotatable joint is operable to rotate relative to the riser pipe;

an arm extending from the platform and operable to be rotated relative to the platform above a pivot point;

a second rotatable joint coupled to the first rotatable joint through one or more rigid members, wherein the second rotatable joint is operable to rotate relative to the platform;

an extension pipe extending from the second rotatable joint to a distal end of the arm;

wherein a counter balance portion of the arm extends from the pivot point in a direction opposite to the extension pipe;

wherein a mass of the counter balance portion of the arm, including weights coupled to the counter balance portion, is not equal to a mass of the extension portion of the arm, including the extension pipe, an end rotating device coupled to the distal end of the arm opposite the counter balance portion, and an vessel attachment assembly coupled to the extension pipe.

18. The liquid loading device as recited in claim 17, wherein the mass of the counter balance portion of the arm and weights is substantially less than the mass of the extension portion of the arm, including the extension pipe, the end rotating device, and the vessel attachment assembly.

19. The liquid loading device as recited in claim 17, wherein the pivot point is formed at an intersection of the arm and a longitudinal axis extending from a center of the riser pipe.

* * * * *